United States Patent Office 3,000,843
Patented Sept. 19, 1961

3,000,843
FILM-FORMING COMPOSITION COMPRISING AN ADMIXTURE OF PARTICULATE POLYVINYL FLUORIDE AND A LACTAM
Lester Ray Bartron, Wilmington, Del., assignor to E. I. du Pont de Nemours and Company, Wilmington, Del., a corporation of Delaware
No Drawing. Filed May 18, 1959, Ser. No. 813,669
13 Claims. (Cl. 260—30.2)

This invention relates to compositions of matter, and more particularly to novel film-forming compositions suitable for the manufacture of polyvinyl fluoride films. This application is a continuation-in-part of my copending application Serial No. 679,761, filed August 22, 1957.

The preparation of orientable polyvinyl fluoride is described in U.S. Patents 2,419,008, 2,419,010, 2,510,783 and 2,599,300. Although films of polyvinyl fluoride have been described, no entirely satisfactory film-forming technique has heretofore been devised. With polyvinyl fluorides high enough in molecular weight that films produced therefrom have useful property levels, melt viscosities, even at temperatures well above the crystalline melting temperature of the particular polymer, are too high to permit the production of film therefrom by conventional melt extrusion techniques. Attempts to increase the fluidity of the melt by raising its temperature lead to thermal decomposition of the polymer which occurs at temperatures above approximately 220° C., evidenced chiefly by a brownish discoloration of the film. As a matter of fact, even with radically modified, massive, heavy duty equipment, it has not been possible to melt extrude films of these higher molecular weight polyvinyl fluorides by conventional melt extrusion techniques.

The casting of the films by flowing solutions of the polymer onto suitable surfaces and subsequently removing the solvent from the film would seem to offer a means of avoiding the problems of thermal instability and high melt viscosity associated with melt extrusion. Unfortunately, however, polyvinyl fluoride is insoluble in commonly used solvents such as acetone, petroleum ether, isooctane, xylene, carbon tetrachloride, chloroform, methanol, ethanol, etc., and polyvinyl fluorides of high inherent viscosity (high molecular weight), which are preferred for film manufacture, are only very slightly soluble even in hot solvents such as hot dimethylformamide, tetramethylene sulfone, nitroparaffins, cyclohexanone, dibutyl ketone, mesityl oxide, aniline, phenol, methylbenzoate, phenyl acetate and diethyl phosphate. While the use of hot solutions to accomplish solvent casting techniques has met with some success, it does present serious problems from the standpoint of equipment and safety requirements.

Further, all orientable polyvinyl fluorides do not enjoy even the same degree of limited solubility indicated above. For example, those orientable polyvinyl fluorides produced according to procedures described in U.S. Patents 2,510,783 and 2,599,300, even in the relatively low molecular weight ranges, are not completely soluble even in hot solvents. As polymer molecular weight increases into the more useful range, this degree of intractability increases markedly to the point where undissolved polymer gel may exist even at the boiling point of the solvent. The presence of gel structures precludes the manufacture of homogeneous polyvinyl fluoride film by solution casting of the higher molecular weight polymer.

Furthermore, film formation by solution casting techniques is normally characterized by relatively low throughput efficiency; for example, film yields from a pound of solution commonly range between 0.1 and 0.25 pound. For economy of manufacture, rather extensive solvent recovery and recycling facilities must normally be provided, in addition to rather extensive precautions relating to the toxicity and fire hazards inherent in such operations.

The primary object of this invention, therefore, is to provide a film-forming composition containing as the film-former polyvinyl fluoride of relatively high inherent viscosity, which composition may be readily converted by extrusion techniques into a self-sustaining film at an economically satisfactory throughput efficiency, under such conditions that the polymer is not subjected to thermal degradation. Other objects will appear from the description which follows.

These objects are realized by the present invention which, briefly stated, comprises a fluid composition comprising essentially a uniform admixture of particulate polyvinyl fluoride and at least one organic compound selected from the class represented by the structural formula

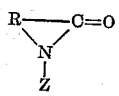

wherein Z is selected from the group consisting of hydrogen and alkyl radicals containing up to eight carbon atoms, and R is a divalent, saturated hydrocarbon radical of 3 to 5 carbon atoms, 3 to 4 carbon atoms of R being in the ring, said composition containing from 5% to 85% by weight of polyvinyl fluoride, based on the total weight of polyvinyl fluoride and said organic compound, and capable of being cast to form a self-supporting film of polyvinyl fluoride.

The polyvinyl fluoride preferred for the film-forming compositions of this invention is of the orientable type, preferably having an inherent viscosity of at least 0.35, and is employed in said film-forming compositions in the form of discrete particles, said particles having a minimum average diameter of not less than about 0.005–0.010 micron.

As representative specific compounds of the aforementioned class of organic compounds of the formula

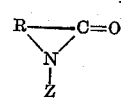

useful for purposes of this invention, there may be mentioned 2-pyrrolidone, N-methyl-2-pyrrolidone, N-isopropyl-2-pyrrolidone, 5-methyl-2-pyrrolidone, 5-ethyl-2-pyrrolidone, 3,3-dimethyl-2-pyrrolidone, 2-piperidone and N-methyl-2-piperidone. These compounds are further characterized in that they have substantially no solvent action on polyvinyl fluoride at room temperature, but are capable of coalescing particles of polyvinyl fluoride at elevated temperatures, i.e., they are latent solvents for the polymer.

Although the polyvinyl fluoride content of the film-forming composition may vary within the range of from 5% to 85% by weight, the optimum ranges will vary according to the film casting technique to be employed. Thus, where the mixture consisting of particulate polyvinyl fluoride uniformly mixed with the organic compound is to be extruded into a coalescing hot oil bath, the polyvinyl fluoride content may range from 25% to 40% by weight, preferably from 30% to 35%. Where the mixture is to be extruded onto a plate or belt at room temperature, followed by heating in air to coalesce, the polyvinyl fluoride content may range from 10% to 60% by weight, preferably from 30% to 40%. And, where the mixture is to be extruded as a hot coalesced mass into a cold quench bath, the polyvinyl fluoride content may range from 20% to 85% by weight, and preferably from 40% to 60% of the composition. These mixtures, depending in part on the proportions used within the specified limits and upon the particular organic compound employed, may range in consistency from fluffy, damp, free-flowing powders through heavy pastes and viscous fluids to freely flowing fluids. The mixtures constituting the film-forming compositions of this invention are, in all of the above-described consistencies, two-phase systems consisting of solid, particulate polyvinyl fluoride (the dispersed, internal or discontinuous phase) and the aforementioned organic compound (the dispersion medium; the external or continuous phase), and are thereby readily distinguishable from true polymer solutions which constitute homogeneous single-phase systems. These film-forming compositions may be prepared by mixing or blending the solid polymer and the aforementioned organic compound by any convenient expedient. Mixing time will vary and will depend in part on the nature of the equipment chosen, the size of the charge in relation to the capacity of the mixer and the percent of the organic compound in the charge.

In addition to the homopolymer, this invention embraces compositions of matter comprising mixtures of at least one of the aforementioned organic compounds with copolymers of vinyl fluoride with other mono-ethylenically unsaturated monomers copolymerizable therewith, wherein the vinyl fluoride is present in substantial or in major amount; i.e., at least 75% to 80% of the total by weight. Examples are monoethylenic hydrocarbons, e.g., ethylene, propylene, isobutylene, and styrene; halogen-substituted ethylenes, e.g., vinyl chloride, vinyl bromide, 1,1-dichloroethylene, 1,1-difluoroethylene, difluorochloroethylene, trifluorochloroethylene, tetrafluoroethylene, trifluoropropylene and difluoroisobutylene; vinyl esters, e.g., vinyl formate, vinyl acetate, vinyl propionate, vinyl butyrate, vinyl pivalate, vinyl benzoate, vinyl stearate and vinyl esters of inorganic acids; vinyl ethers, e.g., vinyl ethyl ether, tetrafluoroethylallyl ether, and vinyl dioxolane; vinyl ketones, e.g., methyl vinyl ketone; N-vinyl imides, e.g., N-vinyl succinimide and N-vinyl phthalimide; acrylic and methacrylic acids and their derivatives, e.g., esters, amides, anhydrides and acid halides, including methyl methacrylate, β-hydroxyethyl methacrylate, allyl methacrylate, N-butyl methacrylamide, etc.; derivatives of maleic and fumaric acids, e.g., diethyl maleate and dimethyl fumarate; propenyl esters, e.g., allyl acetate and isopropenyl acetate.

The following specific examples of preferred embodiments further illustrate the principles and practice of this invention. Parts and percentages are by weight unless otherwise indicated.

In the following examples, polyvinyl fluorides of varying inherent viscosities are employed. Inherent viscosity is measured by dissolving polyvinyl fluoride in hexamethylphosphoramide by violently agitating the mixture at an elevated temperature. The solution is cooled to 30° C., and the viscosity of this solution is measured relative to that of the solvent treated in the same manner. The time of efflux through a viscosimeter is measured for the solvent (no polymer present) and the solution of polymer in solvent. Inherent viscosity is calculated as follows:

Let $T_0$ = solvent flow time in seconds
$T_1$ = solution flow time in seconds $$\text{Relative viscosity} = \frac{T_1}{T_0}$$

Inherent viscosity =
$$\frac{\text{the natural logarithm of relative viscosity}}{C}$$

where C is the concentration expressed in grams of polymer per 100 milliliters of solution.

To minimize the effect of interaction between polymer molecules on the solution viscosity and to keep the solution viscosity of the same order of magnitude as the solvent viscosity, these determinations were made on solutions having very low polymer concentrations. For example, if the relative viscosity for a given sample of polymer exceeded the range of about 1.1 to 1.8 when a concentration, C, of 0.10 gram of polymer per 100 milliliters of solution was employed, a new determination was made with C reduced to 0.05 gram of polymer per 100 milliliters of solution. Where the relative viscosity determined at C=0.10 g./100 ml. of solution was within the 1.1 to 1.8 range, a check run performed at C=0.05 g./100 ml. of solution usually yielded an inherent viscosity which did not vary more than about 5% from that calculated from the run made at the higher polymer concentration.

The above-described techniques and calculations for arriving at inherent viscosity are those commonly employed and accepted as practical in the polymer field, the sole unique feature in the above being the use of hexamethylphosphoramide as the solvent.

Example 1

350 parts of N-methyl-2-pyrrolidone were introduced into a Waring Blendor. The blender was operated at a speed of from 500 to 1,000 r.p.m. while 150 parts of particulate polyvinyl fluoride were added to the N-methyl-2-pyrrolidone, and then continued to operate at this speed for about 30 minutes. Precautions were taken to prevent any appreciable temperature rise during mixing. The polymer had an inherent viscosity of 2.2. After a short burst at a speed of approximately 8,000 r.p.m., the resulting dispersion, 30% polyvinyl fluoride, by weight, was poured into a shallow vessel in order to expose as large a surface per unit of volume as practical.

In order to remove all entrapped air bubbles, the dispersion was then subjected to a high vacuum overnight. The deaerated dispersion was transferred to a feed reservoir which was connected to a slotted, oil-cooled casting hopper whose lips were immersed to a depth of approximately 1/16 inch to 1/8 inch in a heated bath of white mineral oil.

By means of air pressure at 3 p.s.i. gauge, and with the opening of the hopper lips set at approximately 10 mils, the dispersion was extruded into the oil bath which was maintained at approximately 150° C. As the dispersion left the lips of the casting hopper, it coalesced immediately to form a self-supporting film, which, after traveling about 1 to 2 inches through the hot oil bath, was conducted into a bath of cooler white mineral oil, maintained at about 30° C. The resulting film was pliable and tough.

Example 2

Five pounds of particulate polyvinyl fluoride were blended with 5 pounds of N-methyl-2-pyrrolidone by mixing for 15 minutes in a Model A–200 Hobart Mixer at a planetary speed of 86 r.p.m. and a beater speed of 198 r.p.m. The inherent viscosity of the polymer was 3.5. The resulting 50% solids dispersion had a paste-like consistency. The dispersion was fed to a heated extruder and from there to a slotted steel casting hopper maintained at 175° C. from which it was extruded continuously into a water bath maintained at 3° C., producing a tough, pliable, flat sheet. While restrained to prevent shrinkage, the sheet of polyvinyl fluoride was led through a zone of rapidly moving, heated air to volatilize substantially all of the N-methyl-2-pyrrolidone.

Example 3

500 parts of particulate polyvinyl fluoride were blended with 100 parts of N-methyl-2-pyrrolidone by mixing in a conventional ball mill for approximately 16 hours. The inherent viscosity of the polymer was 1.5. The resulting 83% solids dispersion was fed to a heated extruder and from there to a slotted steel casting hopper maintained at from 180° C. to 190° C. from which it was extruded continuously into a water bath maintained at approximately 10° C., producing a tough, pliable, flat sheet. Following quenching, the sheet of polyvinyl fluoride was exposed to a current of rapidly moving, warm air for about 10 minutes. This was sufficient to volatilize substantially all of the N-methyl-2-pyrrolidone.

*Example 4*

400 grams of particulate polyvinyl fluoride having an inherent viscosity of 2.5 were coarsely mixed with 600 grams of N-methyl-2-pyrrolidone, and then this 40% solids mixture charged into a water jacketed stainless steel cylinder, fitted with a screened orifice (200–300 mesh) near the base. A rotatable ½″ diameter shaft on which were mounted three ¼″ thick discs was centrally located within the cylinder. The shaft was connected to a ⅓ H.P. electric motor. Approximately one kilogram of carefully washed and dried "Ottawa sand" of 20–30 mesh occupied about one-third of the free space in the cylinder. The shaft was rotated at 1800 r.p.m. for about 10 minutes. During this time, an intimate mixture of sand and dispersion was formed by the rotating discs and flowed downward toward the orifice, where the sand was restrained by the fine screen while a smooth agglomerate-free dispersion of polyvinyl fluoride in N-methyl-2-pyrrolidone was delivered into a receiver at a temperature of approximately 25° C. Cooling water was circulated through the cylinder jacket to prevent any appreciable rise in temperature during mixing. The dispersion was then deaerated by confining it under a high vacuum for about 4 hours.

After deaeration, this smooth dispersion was transferred from the receiver and continuously cast at approximately room temperature through a flexible hose into a pool on the surface of a highly polished, endless stainless steel belt moving at approximately two feet per minute. The belt then carried the dispersion first under a vertically adjustable, beveled doctor knife and then into a zone blanketed by nitrogen having a relatively low linear velocity where it was heated rapidly to a temperature of approximately 115° C. Slightly less than one minute exposure at this temperature was sufficient to cause the dispersed polyvinyl fluoride particles to coalesce into a continuous clear film. The belt then carried the film into a zone of rapidly circulating air maintained at a temperature of 170° C. Approximately two minutes in this zone was sufficient to evolve substantially all of the N-methyl-2-pyrrolidone. The resulting film, approximately 5 mils thick, was then cooled rapidly with a water spray and stripped from the moving belt.

*Example 5*

600 parts of N-methyl-2-pyrrolidone were introduced into a Waring Blendor. The blender was operated at a speed of from 500 to 1,000 r.p.m. while 400 parts of particulate polyvinyl fluoride were added to the N-methyl-2-pyrrolidone, and then continued to operate at this speed for about 30 minutes. Precautions were taken to prevent any appreciable temperature rise during mixing. The polymer had an inherent viscosity of 3.2. After a short burst at a speed of approximately 8,000 r.p.m. the resulting dispersion, 40% polyvinyl fluoride by weight, was poured into a shallow dish in order to expose as large a surface per unit of volume as practical.

In order to remove all entrapped air bubbles, the dispersion was then subjected to a high vacuum overnight. After deaeration, the resulting smooth dispersion was spread on a flat polished ferrotype plate and placed in an oven at 120° C. After about 40 seconds exposure to this temperature, the polyvinyl fluoride particles coalesced to form a translucent gel film approximately 15 mils thick. After coalescence, the film was quenched by immersing the ferrotype plate in cold water. The film was then stripped from the plate, clamped in a frame to prevent shrinkage and placed in a forced air circulation oven for about 5 minutes at 160–170° C. Nearly all of the N-methyl-2-pyrrolidone was evolved during this exposure. On removal from the oven, the film was again quenched in cold water and removed from the frame. The resulting film was approximately 7 mils thick.

*Example 6*

Equal parts of particulate polyvinyl fluoride having an inherent viscosity of 2.5, and 2-pyrrolidone were coarsely mixed and then this mixture charged into the water-jacketed stainless steel cylinder employed in Example 4. As mixing commenced, warm water was circulated through the cylinder jacket to liquify the 2-pyrrolidone. Thereafter, the heat generated by the mechanical action of mixing was sufficient to maintain the 2-pyrrolidone in the liquid state.

After deaeration, the resulting smooth dispersion was spread on a flat, polished ferrotype plate and placed in an oven maintained at 210° C. After about 30 seconds exposure to this temperature, the polyvinyl fluoride particles coalesced to form a translucent gel film approximately 20 mils thick. After coalescence, the film was quenched by immersing the ferrotype plate in cold water. The film was then stripped from the plate, clamped in a frame to prevent shrinkage and placed in a forced air circulation oven for about 12 minutes at 150° C. Nearly all of the 2-pyrrolidone was evolved during this exposure. On removal from the oven, the film was again quenched in cold water and removed from the frame; the resulting film was approximately 10 mils thick.

*Example 7*

Equal parts of particulate polyvinyl fluoride having an inherent viscosity of 2.8 and 5-ethyl-2-pyrrolidone were coarsely mixed, and then this mixture charged into the water jacketed stainless steel cylinder employed in Example 4. This mixture was further blended following the procedure outlined in Example 6. After deaeration, the resulting smooth dispersion was spread on a flat, polished ferrotype plate and placed in an oven maintained at 205° C. After about 20 seconds' exposure to this temperature, the polyvinyl fluoride particles coalesced to form a translucent gel film approximately 20 mils thick. After coalescence, the film was quenched by immersing the ferrotype plate in cold water. The resulting gel film was tough and pliable.

*Example 8*

350 parts of N-isopropyl-2-pyrrolidone were introduced into a Waring Blendor. The blender was operated at a speed of from 500–1,000 r.p.m. while 150 parts of particulate polyvinyl fluoride were added to the N-isopropyl-2-pyrrolidone, and then continued to operate at this speed for about 30 minutes. Precautions were taken to prevent any appreciable temperature rise during mixing. The polymer had an inherent viscosity of 2.2. After a short burst at a speed of approximately 8,000 r.p.m., the resulting dispersion, 30% polyvinyl fluoride by weight, was poured into a shallow vessel in order to expose as large a surface per unit of volume as practical.

In order to remove all entrapped air bubbles, the dispersion was then exposed to a high vacuum overnight. The deaerated disperson was continuously cast at approximately room temperature through a flexible hose into a pool on the surface of the highly polished, endless stainless steel belt employed in Example 4. The belt, moving at approximately 2 feet per minute, then carried the dispersion first under a vertically adjustable, beveled doctor knife, and then into a zone blanketed by nitrogen having a relatively low linear velocity where it was heated rapidly to a temperature of approximately 185° C. About 50 seconds' exposure at this temperature was sufficient to cause the dispersed polyvinyl fluoride particles to coalesce into a continuous clear film. The belt then carried the film into a zone of rapidly circulating heated air, in which zone substantially all of the N-isopropyl-2-pyrrolidone was volatilized from the film. The resulting film, approximately 8 mils thick, was then cooled rapidly with a water spray and stripped from the moving belt.

Example 9

Equal parts of particulate polyvinyl fluoride having an inherent viscosity of 2.5 and 2-piperidone were coarsely mixed, and then this mixture charged into the water jacketed stainless steel cylinder employed in Example 4. As mixing commenced, water heated to a temperature in the vicinity of 45° C. was circulated through the cylinder jacket to liquify the 2-piperidone. Thereafter, since the heat generated by the mechanical action of mixing had contributed to maintaining the 2-piperidone in the liquid state, the temperature of the water circulating through the cylinder jacket was reduced to approximately 35° C.

After deaeration, the resulting dispersion was cast on a ferrotype plate as in Example 6, coalescence into a gel film being accomplished by exposure for approximately one minute in an oven maintained at 215° C. After coalescence, the film was quenched by immersing the ferrotype plate in cold water. The resulting gel film was tough and pliable.

Example 10

Six pounds of particulate polyvinyl fluoride were blended with four pounds of N-methyl-2-piperidone by mixing for 15 minutes in a Model A-200 Hobart Mixer at a planetary speed of 86 r.p.m. and a beater speed of 198 r.p.m. The inherent viscosity of the polymer was 3.5. The resulting 60% solids dispersion had a damp, powdery consistency. This dispersion was fed to a heated extruder and from there to a slotted steel casting hopper maintained at 175–180° C. from which it was extruded continuously into a water bath maintained at approximately 5° C., producing a tough, pliable, flat sheet. While restrained to prevent shrinkage, the sheet of polyvinyl fluoride was led through a zone of rapidly moving heated air to volatilize substantially all of the N-methyl-2-piperidone.

Example 11

900 parts of N-methyl-2-pyrrolidone were introduced into a Waring Blendor. The blender was operated at a speed of from 500 to 1,000 r.p.m. while 100 parts of particulate polyvinyl fluoride were added to the N-methyl-2-pyrrolidone, and then continued to operate at this speed for about 10 minutes. Precautions were taken to prevent any appreciable temperature rise during mixing. The polymer in this instance had an inherent viscosity of 4.8. After a short burst at a speed of approximately 8,000 r.p.m., the resulting dispersion, 10% polyvinyl fluoride by weight, was poured into a shallow dish in order to expose as large a surface per unit of volume as practical.

In order to remove all entrapped air bubbles, the dispersion was then subjected to a high vacuum overnight. After deaeration, the resulting smooth dispersion, quite fluid in consistency, was spread on a flat polished ferrotype plate and placed in an oven at 135° C. After about 30 seconds exposure to this temperature, the polyvinyl fluoride particles coalesced to form a translucent gel film approximately 15 mils thick. After coalescence, the film was quenched by immersing the ferrotype plate in cold water. The film was then stripped from the plate, clamped in a frame to prevent shrinkage and placed in a forced air circulation oven for about 5 minutes at approximately 165° C. This exposure was sufficient to volatilize substantially all of the N-methyl-2-pyrrolidone. On removal from the oven, the film was again quenched in cold water and removed from the frame. The resulting film was approximately 2 mils thick.

The advantages of this invention are attributable to the great versatility of the organic compounds employed, which lend themselves to mixing and blending in almost unlimited and variable proportions with polyvinyl fluoride. Since compounds depicted by the aforementioned structural formula are either liquids at room temperature or have relatively low melting points, mixing may be accomplished without the additional complication of maintaining elaborate and extensive heating facilities. The compositions of this invention cover a broad spectrum of solids content and may be formed into such shaped structures as films with a variety of equipment and under a wide variety of conditions as shown in the foregoing examples.

The use of these organic compounds permits a very broad approach to the long-standing problem of polyvinyl fluoride film formation. They permit the realization of processes having satisfactory throughput efficiencies without extraordinary investment in equipment and without risking degradation to the polymer itself. They further permit the formation of films from polyvinyl fluorides in the higher molecular weight ranges.

It is to be understood that although the compositions of this invention are chiefly applicable in the manufacture of film, they are useful as well for the preparation of other shaped structures, e.g., fibers, filaments, rods, tubes, etc.

Compounds in this class are quite stable and their use does not require any extraordinary precautions from either the toxicity or the flammability standpoints.

I claim:

1. A film-forming composition capable of being formed into self-supporting film comprising essentially an admixture of particulate polyvinyl fluoride and at least one organic compound selected from the class represented by the structural formula

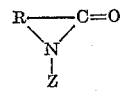

wherein Z is selected from the group consisting of hydrogen and alkyl radicals containing up to 8 carbon atoms and R is a divalent, saturated hydrocarbon radical of from 3 to 5 carbon atoms, 3 to 4 carbon atoms of R being in the ring, the polyvinyl fluoride particles having a minimum average diameter of not less than about 0.005–0.010 micron.

2. A film-forming composition capable of being formed into self-supporting film comprising essentially particulate polyvinyl fluoride dispersed in an organic compound selected from the class represented by the structural formula

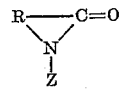

wherein Z is selected from the group consisting of hydrogen and alkyl radicals containing up to 8 carbon atoms and R is a divalent, saturated hydrocarbon radical of from 3 to 5 carbon atoms, 3 to 4 carbon atoms of R being in the ring, the polyvinyl fluoride particles constituting from about 5% to about 85% of the total weight of the dispersion, and having a minimum average diameter of not less than about 0.005–0.010 micron.

3. The composition of claim 2 wherein the polyvinyl fluoride has an inherent viscosity of at least 0.35.

4. A film-forming composition capable of being formed into self-supporting film comprising essentially particulate polyvinyl fluoride dispersed in N-methyl-2-pyrrolidone, the polyvinyl fluoride particles constituting from about 5% to about 85% of the total weight of the dispersion and having a minimum average diameter of not less than about 0.005–0.010 micron.

5. The composition of claim 4 wherein the polyvinyl fluoride has an inherent viscosity of at least 0.35.

6. A film-forming composition capable of being formed into self-supporting film comprising essentially particulate polyvinyl fluoride dispersed in N-methyl-2-piperidone, the polyvinyl fluoride particles constituting from about 5% to about 85% of the total weight of the dispersion and having a minimum average diameter of not less than about 0.005–0.010 micron.

7. The composition of claim 6 wherein the polyvinyl fluoride has an inherent viscosity of at least 0.35.

8. A film-forming composition capable of being formed into self-supporting film comprising essentially particulate polyvinyl fluoride dispersed in 2-pyrrolidone, the polyvinyl fluoride constituting from about 5% to about 85% of the total weight of the dispersion and having a minimum average diameter of not less than about 0.005–0.010 micron.

9. The composition of claim 8 wherein the polyvinyl fluoride has an inherent viscosity of at least 0.35.

10. A film-forming composition capable of being formed into self-supporting film comprising essentially particulate polyvinyl fluoride dispersed in N-isopropyl-2-pyrrolidone, the polyvinyl fluoride particles constituting from about 5% to about 85% of the total weight of the dispersion and having a minimum average diameter of not less than about 0.005–0.010 micron.

11. The composition of claim 10 wherein the polyvinyl fluoride has an inherent viscosity of at least 0.35.

12. A film-forming composition capable of being formed into self-supporting film comprising essentially particulate polyvinyl fluoride dispersed in 5-ethyl-2-pyrrolidone, said polyvinyl fluoride constituting from about 5% to about 85% of the total weight of the dispersion and having a minimum average diameter of not less than about 0.005–0.010 micron.

13. The composition of claim 12 wherein the polyvinyl fluoride has an inherent viscosity of at least 0.35.

References Cited in the file of this patent

UNITED STATES PATENTS

| | | |
|---|---|---|
| 2,419,008 | Coffman et al. | Apr. 15, 1947 |
| 2,687,400 | D'Alelio | Aug. 24, 1954 |
| 2,866,721 | Hetherington | Dec. 30, 1958 |

UNITED STATES PATENT OFFICE
CERTIFICATION OF CORRECTION

Patent No. 3,000,843                        September 19, 1961

Lester Ray Bartron

It is hereby certified that error appears in the above numbered patent requiring correction and that the said Letters Patent should read as corrected below.

Column 8, lines 29, 45, 64, and 73, column 9, lines 7 and 16 and column 10, line 6, after "film", each occurrence, insert -- by coalescence --; column 8, lines 29 and 30, for "an admixture" read -- a two phase system consisting of --; same column 8, line 30, for "and" read -- as a discontinuous phase, and as a continuou phase in which the polyvinyl fluoride particles are uniformly distributed --; same column 8, lines 45, 64, and 73, column 9, lines 7 and 16, and column 10, line 6, after "essentially", each occurrence, insert -- a two phase system consisting of --; column 8, lines 46, 65, and 74, column 9, lines 8 and 17, and column 10, line 7, for "dispersed in", each occurrence, read -- as a discontinuous phase, and as a continuous phase in which the polyvinyl fluoride particles are uniformly dispersed --.

Signed and sealed this 17th day of April 1962.

(SEAL)
Attest:

ESTON G. JOHNSON                           DAVID L. LADD
Attesting Officer                           Commissioner of Patents